United States Patent [19]
Matsuo et al.

[11] 3,835,176
[45] Sept. 10, 1974

[54] ALPHA-CYANOBENZYL CYCLOPROPANECARBOXYLATES

[75] Inventors: Takashi Matsuo, Amagasaki; Nobushige Itaya, Ikeda; Yositosi Okuno; Toshio Mizutani, both of Toyonaka; Nobuo Ohno, Ikeda; Shigeyoshi Kitamura, Toyonaka, all of Japan

[73] Assignee: Sumitomo Chemical Company, Limited, Osaka, Japan

[22] Filed: June 26, 1972

[21] Appl. No.: 266,362

[30] Foreign Application Priority Data
June 29, 1971 Japan.............................. 46-47808

[52] U.S. Cl...... 260/465 D, 260/465 F, 260/465 G, 260/468 H, 424/304, 424/305, 424/306
[51] Int. Cl........................................... C07c 121/66
[58] Field of Search............. 260/465 D, 468 H, 465

[56] References Cited
UNITED STATES PATENTS
| | | | |
|---|---|---|---|
| 3,509,180 | 4/1970 | Elliott............................. | 260/468 X |
| 3,666,789 | 5/1972 | Itaya et al........................... | 260/468 |
| 3,673,234 | 6/1972 | Janiak............................ | 260/465 X |

*Primary Examiner*—Lewis Gotts
*Assistant Examiner*—Dolph H. Torrence
*Attorney, Agent, or Firm*—Stevens, Davis, Miller & Mosher

[57] ABSTRACT

α-Cyanobenzyl cyclopropanecarboxylates of the formula,

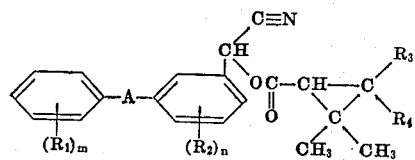

wherein A is oxygen atom or methylene group, $R_1$ and $R_2$ are respectively hydrogen atom, a halogen atom or a lower alkyl group, $R_3$ is hydrogen atom or methyl group, $R_4$ is hydrogen atom, methyl group, phenyl group or

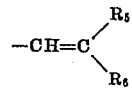

in which $R_5$ is hydrogen atom or methyl group, and $R_6$ is hydrogen atom, methyl group, methoxycarbonyl group, or methoxymethyl group, or $R_5$ and $R_6$ are combined each other at the ends to form a polymethylene group, provided that $R_4$ is methyl group when $R_3$ is methyl group, and $m$ and $n$ are respectively an integer of 1 to 3, which are useful for controlling insects and mites.

7 Claims, No Drawings

ALPHA-CYANOBENZYL CYCLOPROPANECARBOXYLATES

The present invention relates to a novel α-cyanobenzyl cyclopropanecarboxylate and an insecticidal and acaricidal composition containing the same.

More specifically, the present invention relates to a novel α-cyanobenzyl cyclopropanecarboxylate of the formula (I),

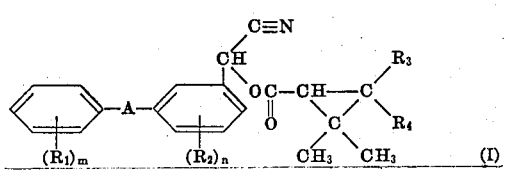

wherein A is oxygen atom or methylene group, $R_1$ and $R_2$ are respectively hydrogen atom, a halogen atom or a lower alkyl group, $R_3$ is hydrogen atom or methyl group, $R_4$ is hydrogen atom, methyl group, phenyl group or

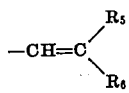

in which $R_5$ is hydrogen atom or methyl group, and $R_6$ is hydrogen atom, methyl group, methoxycarbonyl group or methoxymethyl group, or $R_5$ and $R_6$ are combined each other at the ends to form a polymethylene group, provided that $R_4$ is methyl group when $R_3$ is methyl group, and $m$ and $n$ are respectively an integer of 1 to 3.

There are known various kinds of cyclopropanecarboxylate type insecticides, such as natural pyrethrin, allethrin and tetramethrin [N-(chrysanthemoxymethyl)-3,4,5,6-tetrahydrophthalimide], which are considered to have most prominent knock down effects, and such as resmethrin (5-benzyl-3-furylmethyl chrysanthemate), which is considered to have most prominent killing effect.

These insecticides have been widely used for controlling insects injurious to sanitation as well as agriculature and horticulture, because of their prominent biological activities with low toxicity to mammals.

They have, however, merits and demerits. More concretely speaking, natural pyrethrin, allethrin and tetramethrin which have prominent knock down effects are not satisfactory in their killing effects, and therefore are necessarily used together with any synergist or other auxiliary agent for enhancing the killing effects, and resmethrin which has prominent killing effect is necessarily used together with tetramethrin and the other for enhancing the knock down effect, because of its insufficient knock down effect. In addition, they are so expensive that they should be used within application limited from economical point of view.

The present inventors have investigated with respect to homologues of 3-phenoxybenzyl and 3-benzylbenzyl cyclopropanecarboxylates in order to provide insecticidal cyclopropanecarboxylates having more prominent biological activities at low cost, and have found that the α-cyanobenzyl cyclopropanecarboxylates of the formula (I) have knock down effect similar or superior to that of allethrin as well as killing effect superior to that of resmethrin, and can be prepared at so low cost that they may be used widely for controlling insects injurious to sanitation as well as agriculture, horticulture and stored cereals.

The α-cyanobenzyl cyclopropanecarboxylates of the formula (I) are novel, and may be prepared by reacting a cyclopropanecarboxylic acid, or a reactive derivative thereof, represented by the formula (II),

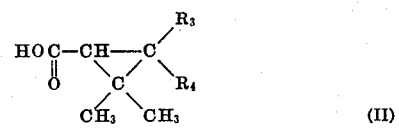

wherein $R_3$ and $R_4$ are as defined above, with a compound of the formula (III),

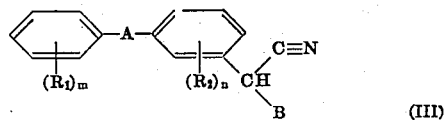

wherein A, $R_1$, $R_2$, $m$ and $n$ are as defined above, and B is hydroxy group, tosyloxy group or a halogen atom, if desired in the presence of a reaction auxiliary agent.

Alternatively, the α-cyanobenzyl cyclopropanecarboxylates of the formula (I) may be prepared by reacting the acid halide of the formula (IV),

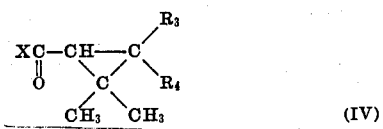

wherein $R_3$ and $R_4$ are as defined above, and X is a halogen atom, with an aldehyde of the formula (V),

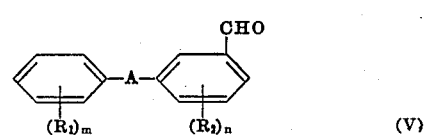

wherein A, $R_1$, $R_2$, $m$ and $n$ are as defined above, in the presence of sodium or potassium cyanide, if necessary, in an aprotic solvent.

As for the process for the production of the α-cyanobenzyl cyclopropanecarboxylate of the formula (I), more detailed explanation will be given as follows.

The reactive derivatives of the cyclopropanecarboxylic acid represented by the formula (II) include an acid halide, an acid anhydride, and a salt thereof.

In case where an alcohol having hydroxy group as B in the formula (III) is used, the reaction may be conducted with the cyclopropanecarboxylic acid of the formula (II), an acid halide or an acid anhydride thereof.

The reaction between the alcohol and the carboxylic acid of the formula (II) is conducted under a dehydration condition, more concretely in the presence of an acid catalyst such as a mineral acid, and in the presence of an azeotropic solvent such as benzene and toluene with heating, whereby the α-cyanobenzyl cyclopropanecarboxylate of the formula (I) is obtained. Alternatively, the reaction may be conducted in an inert solvent such as benzene and petroleum ether in the presence of a dehydrating agent such as dicyclohexylcarbodiimide, whereby the objective ester may be given in a high yield.

The reaction between the alcohol and the carboxylic acid halide is conducted effectively at room temperature in the presence of a dehydrogen halide agent of an organic tertiary amine such as pyridine and triethylamine. The reaction is conducted ordinarily in an inert solvent such as benzene by use of the acid chloride.

The reaction between the alcohol and the carboxylic acid anhydride may be conducted under the condition similar to that in the reaction between the alcohol and the acid halide, or may be conducted in the presence or absence of the solvent with heating.

In case where a compound having a halogen atom or tosyloxy group as B in the formula (III) is used, a salt of an alkali metal or an organic tertiary base is used as the reactive derivative of the cyclopropanecarboxylic acid of the formula (II). The said alkali metal salt or said base may be added in the course of the reaction together with the cyclopropanecarboxylic acid to form the salt thereof. The reaction is preferably conducted in the presence of an inert solvent such as benzene, acetone and dimethylformamide, preferably with heating at or below boiling point of the solvent to be used. Preferable halogen atoms include chlorine and bromine.

The cyclopropanecarboxylic acid of the formula (II) may be easily obtained according to the known method, and if necessary, may be converted to the reactive derivative thereof also according to the known method.

Alternatively, a mixture of the acid chloride of the formula (IV) and the aldehyde of the formula (V), or a solution of the mixture in an aprotic solvent is added to an aqueous solution of sodium or potassium cyanide, and the resulting mixture is stirred to obtain the α-cyanobenzyl cyclopropanecarboxylate of the formula (I).

The alcohol of the formula (III) may be easily prepared by the reaction of the aldehyde of the formula (V), with hydrogen cyanide, and the halide or tosylate thereof may be easily obtained by the reaction between the said alcohol and a halogenating agent or p-toluenesulfonyl chloride.

The typical examples of the α-cyanobenzyl cyclopropanecarboxylates obtained according to the above mentioned process are given as follows.

The α-cyanobenzyl cyclopropanecarboxylates of the present invention include, of course, stereo isomers thereof due to the stereo structure of the cyclopropanecarboxylic acid of the formula (II) and the compound of the formula (III), and optical isomers thereof due to the assymetric carbon atom.

Compound No.             Formula (1)
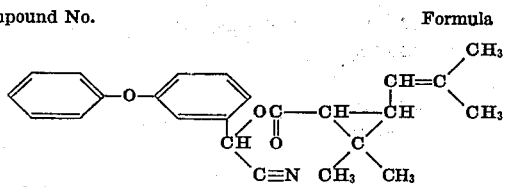

3-Phenoxy-α-cyanobenzyl chrysamethemate (2)
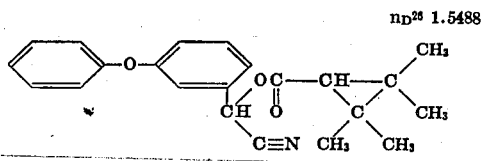

3-Phenoxy-α-cyanobenzyl 2',2',3',3'-tetramethylcyclopropanecarboxylate (3)
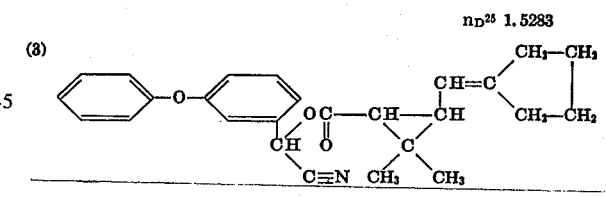

3-Phenoxy-α-cyanobenzyl 2',2'-dimethyl-3'-cyclopentylidenemethylcyclopropanecarboxylate (4)
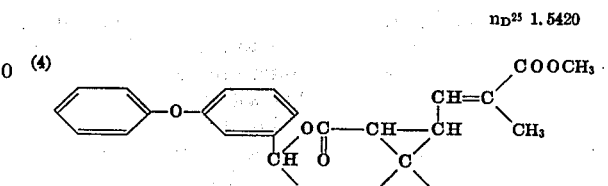

3-Phenoxy-α-cyanobenzyl pyrethrate (5) 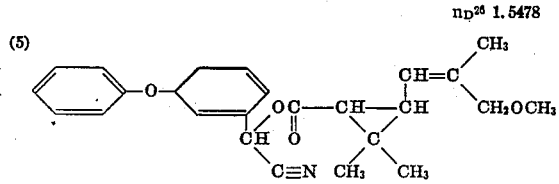 $n_D^{25}$ 1.5478

3-Phenoxy-α-cyanobenzyl 2',2'-dimethyl-3'-(2''-methoxymethyl-1''-propenyl)cyclopropanecarboxylate (6) 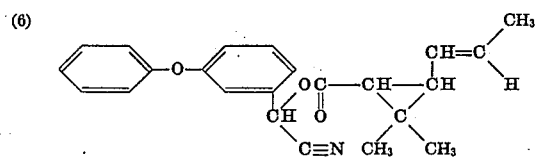 $n_D^{25}$ 1.5483

3-Phenoxy-α-cyanobenzyl 2',2'-dimethyl-3'-(1''-transpropenyl)cyclopropanecarboxylate (7) 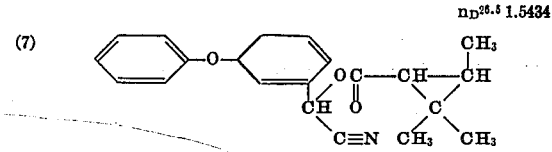 $n_D^{26.5}$ 1.5434

3-Phenoxy-α-cyanobenzyl 2',2',3'-trimethylcyclopropanecarboxylate (8) 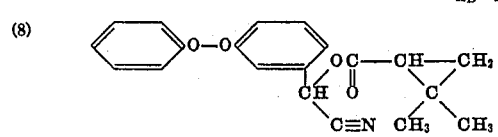 $n_D^{25}$ 1.5471

3-Phenoxy-α-cyanobenzyl 2',2'-dimethylcyclopropanecarboxylate (9) 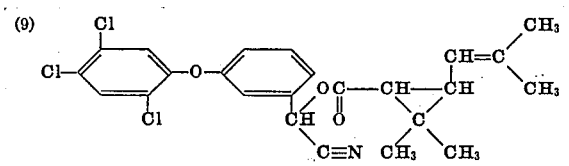 $n_D^{26.5}$ 1.5463

3-(2',4',5'-Trichlorophenoxy)-α-cyanobenzyl chrysanthemate

(10) 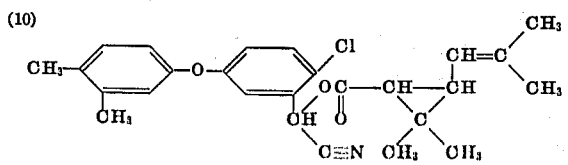 $n_D^{25.5}$ 1.5527

2-Chloro-5-(3',4'-dimethylphenoxy)-α-cyanobenzyl chrysanthemate

(11) 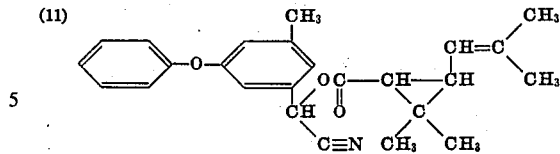 $n_D^{26}$ 1.5370

3-Methyl-5-phenoxy-α-cyanobenzyl chrysanthemate

(12) 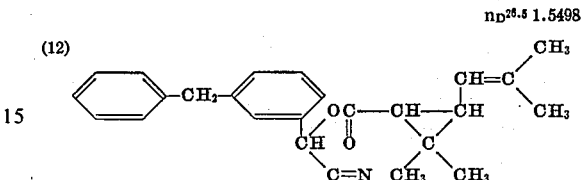 $n_D^{25.5}$ 1.5498

3-Benzyl-α-cyanobenzyl chrysanthemate

(13) 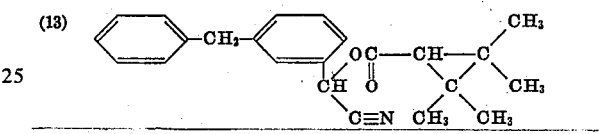 $n_D^{25.5}$ 1.5480

3-Benzyl-α-cyanobenzyl 2',2',3',3'-tetramethylcyclopropanecarboxylate

(14) 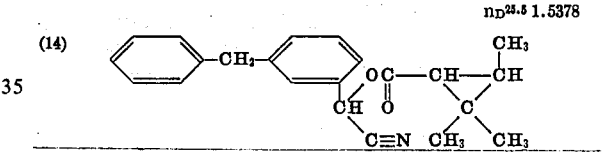 $n_D^{25.5}$ 1.5378

3-Benzyl-α-cyanobenzyl 2',2',3'-trimethylcyclopropanecarboxylate

(15) 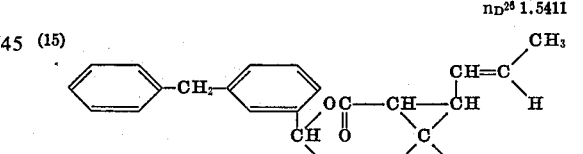 $n_D^{25}$ 1.5411

3-Benzyl-α-cyanobenzyl 2',2'-dimethyl-3'-(1''-transpropenyl)cyclopropanecarboxylate

(16) 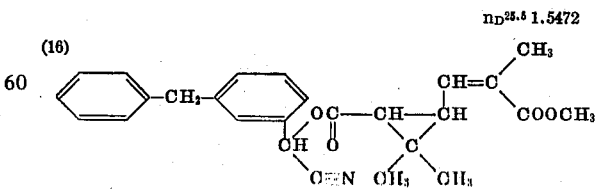 $n_D^{25.5}$ 1.5472

3-Benzyl-α-cyanobenzyl pyrethrate

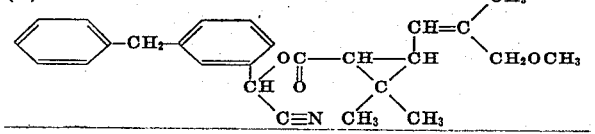

3-Benzyl-α-cyanobenzyl 2',2'-dimethyl-3'-(2''-methoxymethyl-1''-propenyl)cyclopropanecarboxylate

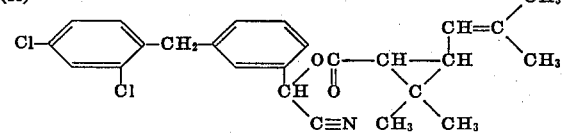

3-(2',4'-Dichlorobenzyl)-α-cyanobenzyl chrysanthemate

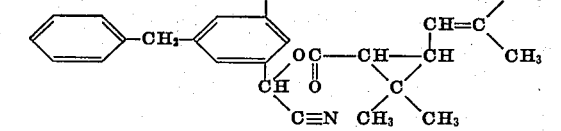

3-Benzyl-5-chloro-α-cyanobenzyl chrysanthemate

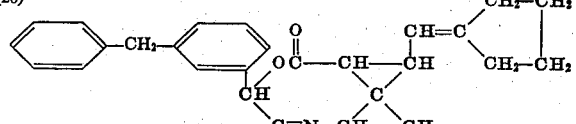

3-Benzyl-α-cyanobenzyl 2',2'-dimethyl-3'-cyclopentylidenemethyl cyclopropanecarboxylate

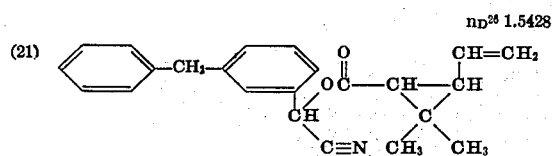

3-Benzyl-α-cyanobenzyl 2',2'-dimethyl-3'-vinylcyclopropanecarboxylate

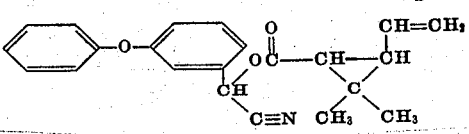

3-Phenoxy-α-cyanobenzyl 2',2'-dimethyl-3'-vinylcyclopropanecarboxylate

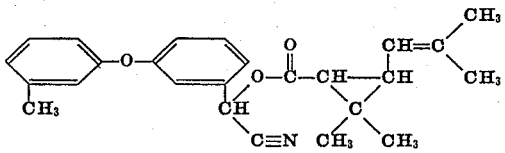

3-(m-Tolyloxy)-α-cyanobenzyl chrysanthemate

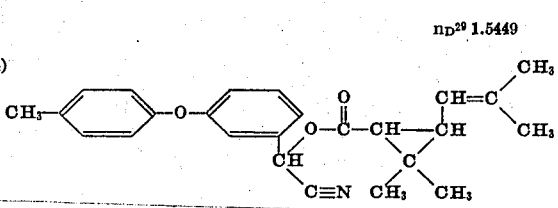

3-(p-Tolyloxy)-α-cyanobenzyl chrysanthemate

The α-cyanobenzyl cyclopropanecarboxylates of the formula (I) have prominent insecticidal activities as well as acaricidal activities with low toxicity to mannals, for example, oral toxicity to mouse being more than 500 mg/kg of $LD_{50}$ value.

In order to substantiate the prominent insecticidal and acaricidal activities of the present α-cyanobenzyl cyclopropanecarboxylates, there are given referential examples, comparing with the known compounds including the compounds having formula similar to that of the present α-cyanobenzyl cyclopropanecarboxylate.

Referential Example 1.

The present compounds (1), (2), (12) and (13) and known compounds were respectively dissolved in acetone, and were adjusted to a test concentration. Each solution was added to dorsum prothorax of house fly adults, and to head and tail of hibernating larvae of rice stem borers. After one day concerning house flies, and after 3 days concerning rice stem borers, the dead and alive were observed to calculate $LD_{50}$ value (Lethal dose required for killing a half).

The results are as shown in Table 1.

TABLE 1

| Compound | Effect on house fly adult | | Effect on rice stem borer | |
|---|---|---|---|---|
| | $LD_{50}$ ($\gamma$/fly) | Relative effectiveness | $LD_{50}$ ($\gamma$/larva) | Relative effectiveness |
| Present compound: | | | | |
| (1) | 0.03 | 2,667 | 0.01 | 1,300 |
| (2) | 0.05 | 1,600 | 0.007 | 1,857 |
| Known compound (A): [structure] | 0.07 | 1,143 | 0.72 | 18 |
| Known compound (B): [structure] | 0.11 | 727 | 0.38 | 34 |
| Present compound: | | | | |
| (12) | 0.037 | 2,162 | 0.019 | 684 |
| (13) | 0.062 | 1,290 | 0.011 | 1,182 |
| Resmethrin | 0.04 | 2,000 | 0.20 | 65 |
| Pyrethrin | 0.52 | 154 | 0.24 | 54 |
| Phenitrothion | 0.64 | 125 | 0.13 | 100 |
| Allethrin | 0.80 | 100 | | |

Referential Example 2.

The present compounds (1), (2), (5), (6), (7), (12) and (13), and known compounds were respectively adjusted to a test concentration with deodorized kerosene.

Into a (70 cm)³ glass chamber, about 20 house fly adults and 20 Northern house mosquito adults individually were liberated, and each 0.7 ml of the oil spray was sprayed uniformly thereinto by means of a glass atomizer under pressure of 1.5 kg/cm². The number of the adults knocked down was counted according to the lapse of time.

The test was repeated several times in respect to each oil spray, and $KT_{50}$ value (time for the knock-down of a half) calculated from the results thereof is as shown in Table 2.

TABLE 2

| Compound | Concentration, percent | Effect on house fly adult | | Effect on Northern house mosquito adult | |
|---|---|---|---|---|---|
| | | $KT_{50}$ (sec.) | Relative effectiveness | $KT_{50}$ (sec.) | Relative effectiveness |
| Present compound: | | | | | |
| (1) | 0.1 | 225 | 124 | 230 | 122 |
| (2) | 0.1 | 193 | 145 | 185 | 151 |
| Known compound (A): [structure] | 0.3 | 380 | <30 | 394 | <30 |
| Known compound (B): [structure] | 0.3 | 250 | <100 | 242 | <100 |
| Present compound: | | | | | |
| (5) | 0.1 | 143 | 196 | 149 | 188 |
| (6) | 0.1 | 200 | 140 | 214 | 131 |
| (7) | 0.1 | 150 | 187 | 132 | 210 |
| Known compound (C): [structure] | 0.3 | 237 | <100 | 225 | <100 |
| Known compound (D): [structure] | 0.3 | 446 | <30 | 459 | <30 |

TABLE 2—Continued

| Compound | Concentration, percent | Effect on house fly adult KT$_{50}$ (sec.) | Effect on house fly adult Relative effectiveness | Effect on Northern house mosquito adult KT$_{50}$ (sec.) | Effect on Northern house mosquito adult Relative effectiveness |
|---|---|---|---|---|---|
| Known compound (E): CH$_2$=CH·CH$_2$-C$_6$H$_4$-CH$_2$OC(=O)-CH—CH—CH=C(CH$_3$)$_2$ with C(CH$_3$)$_2$ | 0.3 | 430 | 65 | 452 | 62 |
| Known compound (F): C$_6$H$_5$-CH$_2$-C$_6$H$_4$-CH$_2$OC(=O)-CH—CH—CH=C(CH$_3$)$_2$ with C(CH$_3$)$_2$ | 0.3 | >600 | <30 | >600 | <30 |
| Present compound: | | | | | |
| (12) | 0.1 | 269 | 104 | 275 | 105 |
| (13) | 0.1 | 217 | 129 | 220 | 132 |
| Known compound (G): C$_6$H$_5$-CH$_2$-CH$_2$OC(=O)-CH—CH—CH=C(CH$_3$)$_2$ with C(CH$_3$)$_2$ | 0.3 | 440 | <30 | 472 | <30 |
| Resmethrin | 0.1 | 304 | 92 | 360 | 78 |
| Allethrin | 0.1 | 280 | 100 | 290 | 100 |

Referential Example 3

The present compounds (1), (2), (3), (5), (6), (12) and (13) and known compounds were respectively formulated into each oil spray having each different concentration by use of deodorized kerosene. Each 5 ml of the oil spray was sprayed by means of a Campbel's turn table [Soap and Sanitary chemicals, Vol. 14, No. 6, 119 (1938)], and the shutter was opened on 20 seconds after the spraying.

A group of about 100 house fly adults was exposed to descending spray for 10 minutes, thereafter was transferred to an observation cage, was fed, and was allowed to stand at room temperature.

After a day, the dead and alive were counted to calculate the lethal ratio.

The test was repeated several times, and the LC$_{50}$ value (lethal concentration required for killing a half) obtained from the results is as shown in Table 3.

TABLE 3

| Compound | LC$_{50}$ (mg./100 ml.) | Relative effectiveness |
|---|---|---|
| Present compound: | | |
| (1) | 6 | 1,917 |
| (2) | 7 | 1,643 |
| Known compound (A): CH$_2$OC(=O)-CH—CH—CH=C(CH$_3$)$_2$ with C(CH$_3$)$_2$, C$_6$H$_5$-O-C$_6$H$_4$- | 17 | 676 |
| Known compound (B): CH$_2$OC(=O)-CH—C(CH$_3$)$_2$ with C(CH$_3$)$_2$, C$_6$H$_5$-O-C$_6$H$_4$- | 21 | 548 |
| Present compound: | | |
| (3) | 5 | 2,300 |
| (5) | 7.5 | 1,533 |
| (6) | 5 | 2,300 |
| Known compound (D): CH$_2$OC(=O)-CH—CH—CH=C(CH$_3$)$_2$ with C(CH$_3$)$_2$, C$_6$H$_5$-O-C$_6$H$_3$(CH$_3$)- | 60 | 192 |

TABLE 3—Continued

| Compound | LC$_{50}$ (mg./100 ml.) | Relative effectiveness |
|---|---|---|
| Present compound: | | |
| (12) | 6.7 | 1,716 |
| (13) | 8 | 1,438 |
| Known compound (E): $CH_2=CH\cdot CH_2-\langle\rangle-CH_2OC(O)-CH-CH-CH=C(CH_3)_2$ with cyclopropane $C(CH_3)_2$ | 78 | 147 |
| Known compound (F): $\langle\rangle-CH_2-\langle\rangle-CH_2OC(O)-CH-CH-CH=C(CH_3)_2$ with cyclopropane $C(CH_3)_2$ | 450 | 26 |
| Known compound (G): $\langle\rangle-CH_2-\langle\rangle-CH_2OC(O)-CH-CH-CH=C(CH_3)_2$ with cyclopropane $C(CH_3)_2$ | 27 | 426 |
| Resmethrin | 10 | 1,150 |
| Pyrethrin | 87 | 132 |
| Tetramethrin | 92 | 125 |
| Allethrin | 115 | 100 |

Referential Example 4.

Each 25 parts by weight of the present compounds (1), (2), (3), (6), (12) and (13) and known compounds, 25 parts by weight of Sorpol SM-200 (Trade mark of an emulsifier produced by Toho Chem. Co. in Japan) and 50 percent by weight of xylene were uniformly mixed to prepare each emulsifiable concentrate, which was adjusted to a designed concentration by use of pure water.

a. Into a 300 ml glass beaker, each 200 ml of the emulsion adjusted to a designed concentration was introduced, and a group of about 30 larvae of Northern house mosquitoes was liberated therein for 24 hours to calculate the lethal ratio.

b. About 10 rice plants elapsed 20 days after sowing were dipped in each emulsion adjusted to a designed concentration for 1 minute, were air-dried, and thereafter were put into a test tube, in which 15 adults of smaller brown planthoppers were liberated in advance, and which was closed with a cotton stopper. After 24 hours the lethal ratio was calculated.

c. A twig of Himalayan cryptomeria was dipped in emulsion prepared by the 2,000 times dilution of each compound for 1 minute, and was put in a glass Petri dish having a diameter of 14 cm and a height of 7 cm. A group of about 10 larvae of Lendrolimus sp. was liberated therein, and the whole was covered with a wire net.

After 48 hours, the lethal ratio was calculated.

The results are as shown in Table 4.

The LC$_{50}$ value (50 percent lethal concentration) in respect to larvae of Northern house mosquitoes and adults of smaller brown planthoppers was calculated from the results obtained by the tests repeated 3 to 5 times.

TABLE 4

| Compound | Larvae of Northern house mosquito, LC$_{50}$ (p.p.m.) | Adults of smaller brown planthopper, LC$_{50}$ (dilution fold) | Lethal ratio of larvae of Lendrolimus sp., percent |
|---|---|---|---|
| Present compound: | | | |
| (1) | 0.0063 | 98,000 | 100 |
| (2) | 0.0042 | 190,000 | 100 |
| (3) | 0.0040 | 175,000 | 100 |
| (6) | 0.0067 | 160,000 | 100 |
| (12) | 0.0085 | 67,000 | 100 |
| (13) | 0.0060 | 105,000 | 100 |
| Known compound (A): $\langle\rangle-O-\langle\rangle-CH_2OC(O)-CH-CH-CH=C(CH_3)_2$ with cyclopropane $C(CH_3)_2$ | 0.03 | 37,500 | 90 |
| Known compound (G): $\langle\rangle-CH_2-\langle\rangle-CH_2OC(O)-CH-CH-CH=C(CH_3)_2$ with cyclopropane $C(CH_3)_2$ | 0.036 | 32,000 | 60 |
| Allethrin | 0.125 | 3,500 | 20 |

As is clear from the above Referential Examples, the present compounds have prominent insecticidal activities to house flies and mosquitoes as well as insects injurious to sanitation such as cockroaches, and insects injurious to cereals, and in addition have low toxicity to mammals. Therefore, the compounds of the present invention may be useful for controlling insects injurious to sanitation and stored cereals.

Moreover, the present compounds may be useful for controlling insects injurious to agriculture and forest such as rice stem borers, green rice leafhoppers, smaller brown planthoppers, Japanese giant silk moth, common cabbage worms, army worms, diamondback moth, cut worms and tent catapillars, as well as mites.

Further, the present compounds have controlling effects of ladybugs and mites by their respective activities. Thus, the present compounds can be used without anxiety on crops just before harvest, and cereals, and for horticulture, green house, and on foods and packing materials, because of harmlessness to mammals due to low toxicities.

According to the method known by the skilled in the art with use of ordinary diluents used in conventional pyrethroids, the present compounds may be formulated into oil sprays, emulsifiable concentrates, dusts, aerosols, wettable powders, granules, mosquito coils, heating or non-heating fumigants, attractive dusts and solids containing attractive materials such as baits, and other optional preparations, whereby the present insecticidal and acaricidal compositions can be given.

Further prominent insecticidal and acaricidal activities can be attained by using a mixture of two or more kinds of the present compounds, or by use of synergists for pyrethroids such as α[2-(2-butoxyethoxy)ethoxy]-4,5-methylenedioxy-2-propyltoluene (hereinafter referred to as piperonyl butoxide), 1,2-methylenedioxy-4-[2-(octylsulfinyl)propyl]benzene (hereinafter referred to as sulfoxide), 4-(3,4-methylenedioxyphenyl)-5-methyl-1,3-dioxane (hereinafter referred to as safroxane), N-(2-ethylhexyl)-bicyclo[2,2,1]hept-5-ene-2,3-dicarboxyimide (hereinafter referred to as MGK—264), octachlorodipropyl ether (hereinafter referred to as S—421), isoboronylthiocyanoacetate (hereinafter referred to as Thanite), etc., and other synergists used for allethrin and pyrethrin.

There may be admixed as a stabilizer phenol derivatives such as BHT, bis-phenol derivatives, and arylamines such as phenyl-α-naphthylamine, phenyl-β-napthylamine and a condensate of phenetidine and acetone, thereby to obtain insecticidal and acaricidal compositions having stabilized effects.

In addition, a multi-purpose composition may be prepared by further admixing with other biological chemicals, and as a result thereof synergistic effect will be expected. The other biological chemicals include cyclopropanecarboxylate type insecticides such as pyrethrin (pyrethrum extract), allethrin, tetramethrin, resmethrin, 5-propargylfurfuryl chrysanthemate, 5-propargyl-2-methyl-3-furylmethyl chrysanthemate, and their stereo and optical isomers and the other, organic chlorine type insecticides such as DDT, BHT and methoxychlor, organic phosphorine type insecticides such as O,O-dimethyl-O-(3-methyl-4-nitrophenyl)-phosphorothioate (hereinafter referred to as fenitrothion), O,O-dimethyl-O-(-(2,2-dichlorovinyl)-phosphate (hereinafter referred to as DDVP), dimethyldicarbethoxyethyl dithiophosphate (trade mark: Malathion), 2-methoxy-4H-1,3,2-benzodioxaphosphorin-2-sulfide (trade mark: Salithion), ethyl dimethyldithiophosphorylphenylacetate (trade mark: Papthion), dimethyl-p-cyanophenyl-thiophosphate (trade mark: Cyanox), O,O-dimethyl 1-hydroxy-2,2,2-trichloroethyl phosphate (trade mark: Dipterex), 2-isopropyl-4-methylpyrimidyl-6-diethyl-thiophosphate (trade mark: Diazinon), and dimethyl S-(N-methylcarbamoylmethyl)dithiophosphate, carbamate type insecticides such as 1-naphthyl-N-methylcarbamate, 3,4-dimethylphenyl-N-methylcarbamate, 3,5-dimethylphenyl-N-methylcarbamate, 2-isopropoxyphenyl-N-methylcarbamate (trade mark: Suncide) and S-methyl-N-[(methylcarbamoyl)oxy] thioacetimidate (trade mark: Lannate) and N'-(2-methyl-4-chlorophenyl)-N,N-dimethylformamidine (trade mark: Galecron), 1,3-bis (carbamoylthio)-2-(N,N-dimethylamino) propane hydrochloride (trade mark: Padan), and other insecticides, fungicides, nematocides, acaricides, herbicides, fertilizer and other agricultural chemicals.

The present invention will be explained in more detail with reference to the following examples, which are only illustrative, and not limitative.

Preparation of the Present Compounds Compounds

Example 1 (the reaction between an alcohol and a carboxylic acid)

In a rectifier equipped with a water-separator, was refluxed a mixture of a solution of 2.25g of 3-phenoxy-α-cyanobenzyl alcohol and 1.70 g of chrysanthemic acid in 20 ml of benzene, and 10 mg of p-toluenesulfonic acid. Water produced was removed from a top of the rectifier, and after 4 hours there was no appearance of water produced. After cooling, the reaction liquid slightly colored in brown as it was, was passed through a column packed with 20 g of activiated alumina, and was extracted with benzene, whereby there were removed the colored material, the unreacted acid and the unreacted alcohol.

The solvent was removed by distillation to obtain 3.3 g of 3-phenoxybenzyl-α-cyanobenzyl chrysanthemate as almost colorless oily product, $n_D^{26}$ 1.5488.

| Elementary Analysis | C (%) | H (%) | N (%) |
| --- | --- | --- | --- |
| Found | 77.01 | 6.23 | 3.61 |
| Calculated (as $C_{24}H_{25}NO_3$) | 76.77 | 6.71 | 3.73 |

Example 2 (the reaction between an alcohol and a carboxylic acid)

A solution of 2.25 g of 3-phenoxy-α-cyanobenzyl alcohol and 1.42 g of 2,2,3,3-tetramethylcyclopropanecarboxylic acid in 20 ml of dry benzene was cooled with ice water. A solution of 2.7 g of dicyclohexylcarbodiimide in 10 ml of dry benzene was added to the above solution over 20 minutes, and the mixture was allowed to stand over night. On next day, the mixture was stirred for 2 hours, and thereafter was cooled, and was filtered to remove precipitates. The filtrate slightly colored was mixed with 2 g of activated alumina and 1 g of silica gel, and the mixture was stirred for 30 minutes and was filtrered. Evaporation of the solvent gave 2.9 g of 3-phenoxy-α-cyanobenzyl 2', 2', 3', 3'-tetramethylcyclopropanecarboxylate as pale yellow oily product, $n_D^{25}$ 1.5283.

| Elementary Analysis | C (%) | H (%) | N (%) |
|---|---|---|---|
| Found | 75.83 | 6.44 | 3.76 |
| Calculated | 75.62 | 6.63 | 4.01 |
| (as $C_{22}H_{23}NO_3$) | | | |

Example 3 (the reaction between an alcohol and an acid halide)

Into a solution of 2.25 g of 3-phenoxy-α-cyanobenzyl alcohol and 10 g of pyridine in 20 ml of dry toluene, was added dropwise a solution of 2.20 g of 2,2-dimethyl-3-cyclopentilidenemethyl cyclopropanecarboxylic acid in 10 ml of dry toluene at 20°C or below under cooling with cool water.

The pyridine hydrochloride was immediately precipitated. The mixture was stirred for 4 hours at room temperature, and thereafter was poured onto 20 ml of 2 percent aqueous hydrochloric acid solution. The oily layer separated was washed with 20 ml of 1 percent aqueous sodium hydroxide solution and with 20 ml of a solution saturated with sodium chloride, and thereafter was dried over magnesium sulfate. The solvent was removed by distillation under a reduced pressure.

The residue was passed through a chromatographic column packed with about 50 g of silica gel, and was extracted with benzene, whereby 3.51 g of 3-phenoxy-α-cyanobenzyl 2', 2'-dimethyl-3'-cyclopentilidene-methyl-cyclopropanecarboxylate was obtained as pale yellow oily product, $n_D^{25}$ 1.5420.

| Elementary Analysis | C (%) | H (%) | N (%) |
|---|---|---|---|
| Found | 77.26 | 6.73 | 3.52 |
| Calculated | 77.78 | 6.78 | 3.49 |
| (as $C_{26}H_{27}NO_3$) | | | |

Example 4 (the reaction between an aldehyde and an acid halide)

Into a solution of 6.9 g of sodium cyanide in 150 ml of water, a mixture of 22.3 g of chrysanthemoyl chloride and 19.8 g of 3-phenoxy-benzaldehyde was added dropwise at 0°C. The mixture was stirred for 1 hour at the same temperature, and was extracted twice with 100 ml of ether. The ethereal layer was washed with 5 percent hydrochloric acid solution, 2 percent potassium hydroxide solution and sodium chloride solution, and was dried over magnesium sulfate. The ether was removed by distillation, and the residual yellow oil was passed through a column packed with 400 g of active alumina any extracted with benzene. Evaporation of the solvent gave 26.5 g of 3-phenoxy-α-cyanobenzyl chrysanthemate as a colorless oil, $n_D^{26}$ 1.5481.

| Elementary Analysis | C (%) | H (%) | N (%) |
|---|---|---|---|
| Found | 76.73 | 6.88 | 3.79 |
| Calculated | 76.77 | 6.71 | 3.73 |
| (as $C_{24}H_{25}NO_3$) | | | |

Example 5 (the reaction between a halide and a carboxylic acid salt)

Into a solution of 1.25 g of 2,2-dimethyl-3-(1'-trans-propenyl) cyclopropanecarboxylic acid and 1.50 g of triethylamine in 20 ml of dimethylformamide was added dropwise a solution of 2.50 g of 3-phenoxy-α-cyanobenzylchloride in 10 ml of dimethylformamide.

After the dropwise addition, the temperature was raised gradually to 70°C and the mixture was stirred for 2 hours at the same level of temperature. White precipitates were settled. After cooling, the reaction mixture was poured onto cool water, and the resultant was extracted with toluene, and was washed with 2 percent aqueous sodium hydroxide solution and a solution saturated with sodium chloride. The toluene solution was passed through a column packed with 20 g of activated alumina. Evaporation of the solvent gave 3.02 g of 3-phenoxy-α-cyanobenzyl 2', 2'-dimethyl-3'-(1''-transpropenyl)cyclopropanecarboxylate, as colorless oily product, $n_D^{26.5}$ 1.5434.

| Elementary Analysis | C (%) | H (%) | N (%) |
|---|---|---|---|
| Found | 76.91 | 6.23 | 3.87 |
| Calculated | 76.43 | 6.41 | 3.88 |
| (as $C_{23}H_{23}NO_3$) | | | |

Example 6 (the reaction between a tosylate and a carboxylic acid salt)

Into a solution of 1.68 g of chrysanthemic acid and 1.5 g of triethylamine in 20 ml of dry dimethylformamide was added dropwise a solution of 3.93 g of 3-methyl-5-phenoxy-α-cyanobenzyl tosylate in 10 ml of dimethylformamide at room temperature.

The mixture was treated according to the procedure similar to that of Example 5, whereby 3.3 g of 3-methyl-5-phenoxy-α-cyanobenzyl chrysanthemate was obtained as colorless oily product, $n_D^{26.5}$ 1.5498.

| Elementary Analysis | C (%) | H (%) | N (%) |
|---|---|---|---|
| Found | 77.34 | 6.63 | 3.52 |
| Calculated | 77.09 | 6.99 | 3.60 |
| (as $C_{25}H_{27}NO_3$) | | | |

Example 7 (the reaction between an alcohol and a carboxylic acid)

In a rectifier equipped with a water-separator, was refluxed a mixture of a solution of 2.23 g of 3-benzyl-α-cyanobenzyl alcohol and 1.70 g of chrysanthemic acid in 20 ml of benzene, and 10 ml of p-toluenesulfonic acid. Water produced was removed from a top of the rectifier and after 4 hours there was no appearance of water produced. After cooling, the reaction liquid slightly colored in brown was, as it was, passed through a column packed with 20 g of activated alumina, and extracted with benzene. Thus, colored materials and the unreacted acid and alcohol were removed. Evaporation of the solvent gave 3.0 g of 3-benzyl-α-cyanobenzyl chrysanthemate as almost colorless oily product, $n_D^{25.5}$ 1.5480.

| Elementary Analysis | C (%) | H (%) | N (%) |
|---|---|---|---|
| Found | 80.21 | 6.98 | 3.91 |
| Calculated | 80.39 | 7.29 | 3.75 |
| (as $C_{25}H_{27}NO_2$) | | | |

Example 8 (the reaction between an alcohol and a carboxylic acid)

A solution of 2.23 g of 3-benzyl-α-cyanobenzyl alcohol and 1.42 of 2,2,3,3-tetramethylcyclopropanecarboxylic acid in 20 ml of dry benzene was cooled with ice water. Another solution of 2.7 g of dicyclohexylcarbodiimide in 10 ml of dry benzene was added dropwise to the above solution over 20 minutes, and the mixture was allowed to stand over night at room temperature.

On next day, the mixture was stirred for 2 hours at 50°C, and was cooled, thereby to settle precipitates, which were separated by filtration. The filtrate slightly colored was mixed with 2 g of activated alumina and 1 g of silica gel, and the mixture was stirred for 30 minutes and was filtered. Evaporation of the solvent gave 3.1 g of 3-benzyl-α-cyanobenzyl 2', 2', 3', 3'-tetramethylcyclopropanecarboxylate as pale yellow oily product, $n_D^{25.5}$ 1.5378.

Elementary analysis

| | C (%) | H (%) | N (%) |
| --- | --- | --- | --- |
| Found | 80.06 | 7.23 | 4.32 |
| Calculated (as $C_{23}H_{25}NO_2$) | 79.50 | 7.25 | 4.03 |

Preparation of the present alcohol

Into a solution of 9.8 g of sodium cyanide in 80 ml of ethanol, 19.3 g of 3-phenoxy-benzaldehyde was added dropwise at 0° to 5°C. After 25 ml of acetic acid was added thereto at the same temperature over a period of 1 hour, the mixture was stirred for 1 hour at room temperature. After removal of ethanol by distillation, 50 ml of ether was added thereto. The mixture was sufficiently shaken together with 5 percent aqueous solution of hydrochloric acid, and was thereafter washed with 40 ml of water and 40 ml of aqueous solution saturated with sodium chloride, and was dried over magnesium sulfate. Evaporation of ether gave 21.5 g of 3-phenoxy-α-cyanobenzyl alcohol.

Preparation of the present composition
Parts are by weight.

Example 9

Each 0.1 part of the present compounds (1), (2), (3), (4), (5), (6), (7), (8), (9), (10), (11), (12), (13), (14), (15), (16), (17), (18), (19), (20), (21), (23), (24) and d-trans isomer of the present compound (1) was individually dissolved in deodorized kerosene to make the whole 100 parts, thereby to obtain each oil spray.

Example 10

Each mixture of 0.05 part of the present compounds (1), (2), (3), (4), (5), (6), (7), (8), (9), (10), (11), (12), (13), (14) and d-cis isomer of the present compound (1), with 0.5 part of piperonyl butoxide, was dissolved in deodorized kerosene to make the whole 100 parts, thereby to obtain each oil spray.

Example 11

Each mixture of 0.1 part of the present compounds (1), (6), (9), (12), (15), (16), (17) and (18), with 0.2 part of DDVP was dissolved in kerosene to make the whole 100 parts, thereby to obtain each oil spray.

Example 12

Each 20 parts of the present compounds (1), (2), (3), (5), (6), (7), (9), (10), (11), (12), (13), (15), (19), (20), (21), (23) and (24), 10 parts of Sorpol SM—200 (the same as mentioned above), and 70 parts of xylol were well mixed to be dissolved, thereby to obtain each emulsifiable concentrate.

Example 13

A solution of 0.4 part of the present compound (2) and 2.0 parts of Thanite in 6 parts of xylol and 6.6 parts of deodorized kerosene was introduced into an aerosol vessel, which was thereafter equipped with a valve part. Thereafter 8.5 parts of a propellent (liquefied pertoleum gas) was introduced into the vessel through the valve part under an increased pressure, thereby to obtain aerosol.

Example 14

A solution of 0.4 part of the present compound (5) and 2.0 parts of piperonyl butoxide in 6 parts of xylol and 6.6 parts of deodorized kerosene was treated according to the procedure similar to that of Example 13, thereby to obtain aerosol.

Example 15

A solution of 0.3 part of the present compound (7), 0.1 part of resmethrin and 2.0 part of piperonyl butoxide in 6 parts of xylol and 6.6 parts of deodorized kerosene was treated according to the procedure similar to that of Example 13, thereby to obtain aerosol.

Example 16

A solution of 0.2 part of the present compound (1), 2.0 part of tetramethrin, and 2 parts of S—421 in 6 parts of xylol and 6.6 parts of deodorized kerosene was treated according to the procedure similar to that of Example 13, to obtain aerosol.

Example 17

A solution of 0.4 part of the present compound (8) and 0.5 part of fenitrothion in 7 parts of xylol and 7.1 parts of deodorized kerosene was treated according to the procedure similar to that of Example 13, to obtain aerosol.

Example 18

A mixture of 0.3 part of the resent compound (6), 0.2 part of tetramethrin, 2 parts of piperonyl butoxide, 11.5 parts of deodorized kerosene and 1 part of an emulsifier, Atmos 300 (trade mark of Atmos Chem.) was emulsified by the addition of 50 parts of pure water, and the resulting emulsion was introduced into an aerosol vessel together with a 3 : 1 mixture of deodorized butane and deodorized propane, to obtain a water-based aerosol.

Example 19

Each solution of each 0.6 part of the present compound (2) and (7) in 20 ml of methanol was uniformly mixed respectively with a carrier for a mosquito coil (a 3 : 5 : 1 mixture of tabu powder, marc and wood powder), and methanol was evaporated. After adding 150 ml of water, the mixture was sufficientely kneaded, and thereafter molded and dried to obtain a mosquito coil.

Example 20

A solution of each 0.3 g of the present compound (1) and d-trans isomers of the present compounds (23) and (24) and 0.3 g of allethrin in 20 ml of methanol was treated according to the procedure similar to that of Example 19, to obtain each mosquito coil.

Example 21

A mixture of 0.2 g of the present compound (8) and 0.1 g of 5-propargylfurfuryl chrysanthemate was dissolved in a suitable amount of chloroform. The solution was impregnated to an asbestos of 2.5 × 1.5 cm in area and 0.3 mm in thickness, and another asbestos having the same size mentioned above was faced to the asbestos, to obtain a fibrous insecticidal fumigant by subjecting to heat treatment on a hot plate.

Example 22

Each 5 parts of the present compounds (1), (2), (3), (12) and (13) was sufficiently stirred and mixed in a mortar together with 5 parts of Toyolignin CT (trade mark of Toyobo Co. in Japan) and 90 parts of GSM Clay (trade mark of Zieklite Mining Co.).

Successively, water was added thereto in an amount of 10 percent based on the weight of the mixture, and after stirring, the mixture was granulated by means of a granulator, and was air-dried, to obtain each granule.

Example 23

Each 1 part of the present compounds (1), (2), (3), (6), (10), (12), (13), (23) and (24), and d-cis isomers of the present compounds (23) and (24) and 3 parts of Safroxane in 20 parts of acetone was mixed sufficiently together with 96 parts of 300 mesh diatomaceous earth in a mortar, and evaporation of acetone gave each dust.

Example 24

Each mixture of 20 parts of the present compounds (1), (2), (3), (6), (12) and (13), 5 parts of 1-naphthyl-N-methylcarbamate and 5 parts of Sorpol SM—200 (the same as mentioned above) was respectively mixed well with 70 parts of 300 mesh talc in a mortar, to obtain each wettable powder.

Example 25

Each mixture of 5 parts of the present compounds (1), (2), (6), (12), (13), (19), (20) and (21), 25 parts of fenitrothion, 15 parts of Sorpol SM—200 (the same as mentioned above), and 55 parts of xylol was stirred and mixed sufficiently to be dissolved, thereby to obtain each emulsifiable concentrate.

Example 26

Each 20 parts of the present compounds (1), (4), (6) and (12), and d-cis isomers of the present compounds (23) and (24), 10 parts of Salithion, 10 parts of Sorpol SM-200 (the same as mentioned above) and 60 parts of xylol were stirred and mixed sufficiently to be dissolved, thereby to obtain each emulsifiable concentrate.

Example 27

Each 20 parts of the present compounds (1) and (12), 20 parts of Cyanox (trade mark of Sumitomo Chem. Co. in Japan), 10 parts of Sorpol SM—200 (the same as mentioned above) and 50 parts of xylol were stirred and mixed sufficiently to be dissolved, thereby to obtain each emulsifiable concentrate.

Example 28

Each 20 parts of the present compounds (1), (2), (3), (6), (12) and (13), 10 parts of Galecron (the same as mentioned above), 10 parts of Sorpol SM—200 (the same as mentioned above) and 60 parts of xylol were stirred and mixed sufficiently to be dissolved, thereby to obtain each emulsifiable concentrate.

Example 29

Each solution of 2 parts of the present compounds (1), (2), (3), (4), (6), (12) and (13), and 2 parts of Padan in acetone was stirred and mixed sufficiently together with 96 parts of 300 mesh diatomaceous earth in a mortar, and thereafter evaporation of acetone gave each dust.

Example 30

Each mixture of each 3 parts of the present compounds (1), (2), (3), (6), (12), (13), (23) and (24), 2 parts of diazinon, 5 parts of Toyolignin CT (the same as mentioned above), and 90 parts of GSM Clay (the same as mentioned above) was stirred and mixed sufficiently in a mortar.

Successively, water was added thereto in an amount of 10 percent based on the weight of the mixture, and the mixture was granulated by means of a granulator, and was air-dried, to obtain each granule.

Example 31

Each 20 parts of the present compounds (1), (2), (12) and (13), 20 parts of Vinyphate (trade mark of Kumiai Chem. Co. in Japan), 5 parts of Sorpol SM—200 (the same as mentioned above) and 70 parts of 300 mesh talc were respectively stirred and mixed sufficiently in a mortar, to obtain each wettable powder.

Example 32

Each 20 parts of the present compounds (1), (2), (12) and (13), 5 parts of Lannate, 5 parts of Sorpol SM—200 (the same as mentioned above), and 70 parts of 300 mesh talc were respectively stirred and mixed sufficiently in a mortar, to obtain each wettable powder.

Example 33

Each 10 parts of the present compounds (1), (2), (3), (6), (12), (13), (23) and (24), 10 parts of tetramethrin, 10 parts of Sorpol SM—200 (the same as mentioned above) and 70 parts of xylol were respectively stirred and mixed sufficiently to be dissolved, thereby to obtain each emulsifiable concentrate.

Example 34

Each 15 parts of the present compounds (1), (2), (3), (6), (12) and (13), 25 parts of pyrethrum extract (containing 20 % of pyrethrin), 10 parts of Sorpol SM—200 (the same as mentioned above) and 50 parts of xylol were stirred and mixed sufficiently to be dissolved, thereby to obtain each emulsifiable concentrate.

Example 35

A solution of 0.3 part of the present compound (1) and 0.1 part of d-trans isomer of tetramethrin in 7 parts of xylol and 7.6 part of deodorized kerosene was treated according to the procedure similar to that of Example 13, to obtain aerosol.

Example 36

A solution of 0.2 part of the present compound 9 (1) and 0.2 part of d-trans isomer of allethrin in 7 parts of xylol and 7.6 parts of deodorized kerosene was treated according to the procedure similar to that of Example 13, to obtain aerosol.

Example 37

A solution of 0.2 part of the present compound (1) and 1 part of pyrethrum extract (containing 20 percent of pyrethrin) in 6 parts of xylol and 7.8 parts of deodorized kerosene was treated according to the procedure similar to that of Example 13, to obtain aerosol.

Example 38

A solution of 0.4 part of the present compound (1) in 7.6 parts of xylol and 7 parts of deodorized kerosene was treated according to the procedure similar to that of Example 13, to obtain aerosol.

Example 39

A mixture of 0.3 part of the present compound (1), 0.1 part of d-trans isomer of resmethrin, 13.6 parts of deodorized kerosene and 1 part of an emulsifier, Atmos 300 (the same as mentioned above) was emulsified by the addition of 50 parts of pure water, and thereafter the resulting emulsion was introduced together with a 3 : 1 mixture of deodorized butane and deodorized propane into an aerosol vessel, to obtain a water-based aerosol.

Insecticidal and acaricidal activities of the compositions thus obtained are as shown in the following Test Examples.

It is observed that stereo isomers and optical isomers have also effects similar to that of the mixture, if these isomers are present.

Test Example 1

Each 5 ml of oil sprays obtained in Examples 9, 10 and 11 was sprayed according to the cambel's turn table method [Soap and Sanitary Chemicals, Vol. 14, No. 6,119 (1938)], and a group of about 100 house flies was exposed to the discending spray for 10 minutes.

The flies were taken out, were fed and were allowed to stand. On next day, 80 percent or more of the flies was killed by each oil spray.

Test Example 2

The emulsifiable concentrates obtained in Example 12 were diluted to 20,000 times with water, and 2*l* of the resulting emulsion was introduced into a styrol case of 23 × 30 cm in aerea and 6 cm in depth. About 100 full grown larvae of Northern house mosquitoes were liberated therein, and on next day 90 percent or more of the larvae was killed by each emulsion.

Test Example 3

Into a 14*l* polyethylene bucket, 10*l* of water was introduced, and 1 g of the granule obtained in Example 22 was put thereinto. After one day, about 100 full grown larvae of Northern house mosquitoes were liberated therein, and the dead and alive were observed. As the result, 90 percent or more of the larvae was killed within 24 hours.

Test Example 4

Insectividal activities on house fly adults concerning the aerosols obtained in Examples 13, 14, 15, 16, 17 and 18 were examined according to the aerosol test method by use of a (6 ft)$^3$ Peet Grady's chamber [the method being disclosed in Soap and Chemical Specialities, Blue book (1965)]. The results are as shown in Table 5.

was placed and rotated. Each 0.5 g of the mosquito coils which were obtained in Examples 19 and 20, and which were ignited on both ends, were placed therein, whereby 80 percent or more of the mosquitoes was killed within 20 minutes by each coil.

Test Example 6

About 50 adults of house flies were liberated in a (70 cm)$^3$ glass chamber, in which a small electric battery fan having 13 cm in diameter of a blade was placed and rotated. The insecticidal fumigant obtained in Example 21 placed on an electric heating plate was placed therein and was fumigated by heating, whereby 80 percent or more of the flies was knocked down within 20 minutes.

Test Example 7

Each dust obtained in Example 23 was uniformly spread in a proportion of 2 g/m$^2$ on a wall of a glass Petri dish having 14 cm in diameter, on which butter was coated, leaving at the lower part an uncoated portion of about 1 cm. A group of 10 German cockroach adults were liberated therein.

During 60 minutes contact, 90 percent or more of the cockroaches were knocked down, and on 3 days after the contact, 80 percent or more of the cockroaches knocked down was killed. Test Example 8

A mixture of 100 g of unpolished rice and each 100 ml of dusts obtained in Example 23 was introduced into a 100 ml Erlenmeyer flask. About 50 rice weevils were liberated therein, and the whole was covered and was allowed to stand for a week, whereby 80 percent or more of rice weevils was killed.

Test Example 9

Rice plants elapsed 45 days after sowing were grown in a 1/50,000 Wagner pot.

Emulsifiable concentrates obtained in Examples 12, 33 and 34, and wettable powder obtained in Example 24 were diluted to 200 times with the addition of water, and each diluent was sprayed in a proportion of 10 ml/pot. The whole was covered with a wire net, and about 30 adults of green rice leafhoppers were liberated therein. After one day 100 percent of the leafhoppers was killed.

Test Example 10

Into a glass Petri dish of 14 cm in diameter, 10 larvae of tobacco cutworms grown to 3 to 4 stages were liberated.

Each emulsifiable concentrates containing the present compounds (1), (2), (3), (6), (12), (13), (23) and Table 5

| Composition | | Amount sprayed (g/1000 ft$^3$) | Knock down ratio (%) | | | Lethal ratio (%) |
|---|---|---|---|---|---|---|
| | | | 5 min. | 10 min. | 15 min. | |
| Aerosol of Example | 13 | 3.0 | 20 | 52 | 96 | 96 |
| do. | 14 | 2.8 | 21 | 54 | 90 | 86 |
| do. | 15 | 3.0 | 28 | 59 | 95 | 92 |
| do. | 16 | 3.1 | 30 | 73 | 91 | 73 |
| do. | 17 | 3.0 | 25 | 60 | 92 | 90 |
| Water-base aerosol of Example 18 | | 2.9 | 32 | 71 | 94 | 75 |
| Aerosol of Example | 35 | 3.0 | 32 | 76 | 94 | 70 |
| do. | 36 | 3.2 | 26 | 64 | 90 | 68 |
| do. | 37 | 3.0 | 28 | 67 | 91 | 69 |
| do. | 38 | 2.9 | 18 | 50 | 92 | 82 |
| Water-base aerosol of Example 39 | | 3.1 | 17 | 59 | 95 | 85 |

Test Example 5

About 50 adults of Northern house mosquitoes were liberated in a (70 cm)$^3$ glass chamber, in which a small electric battery fan having 13 cm in diameter of a blade

(24) obtained in Example 12, and each emulsifiable concentrates obtained in Examples 26, 27, 33 and 34, were respectively diluted to 500 times by the addition of water, and each wettable powders obtained in Examples 31 and 32 to 400 times, and each 1 ml of these diluents was respectively sprayed thereon by means of a spray tower.

Thereafter, the cutworms were transferred to another glass Petri dish, in which a bait was placed in advance, and were allowed to stand, whereby 90 percent or more of cutworms was killed after 2 days by each concentrate and powder.

Test Example 11

Many green peach aphids (*Myzus persicae*) were made parasitic on cabbage plants, which elapsed one month after sowing.

The emulsifiable concentrates obtained in Examples 12, 25, 26, 27, 33 and 34 were respectively diluted to 400 times by the addition of water, and the diluent was sprayed thereto on a turn table for the spray in a proportion of 3 ml/stump, whereby 100 percent of aphids was killed after a day.

Test Example 12

The emulsifiable concentrate obtained in Example 12 was diluted to either 50 or 200 times by the addition of water, and tomato plants which elapsed one month after sowing were dipped in each resulting diluent, and were air-dried.

Thereafter, the plants were placed in a plastics vessel equipped with a cover, and 28-spotted lady beetles were liberated therein. After 5 days, 80 percent or more of the beetles was killed by each 50 times diluent.

On the other hand, with respect to the 200 times diluent most of beetles were alive, but the plants were leaved almost harmless, compared with the harm of untreated plants. As the results, there was confirmed a repellent effect of the present compounds.

Test Example 13

Rice plants were grown up to branching in a 1/100,000 Wagner pot, and about 100 eggs per pot of rice stem borers were inoculated. After the borers hatched, bore into the plants, each emulsion prepared by diluting each emulsifiable concentrate to 700 times with water was sprayed on a turn table. The plants were destroyed on a week thereafter, and the dead and alive were observed to find that 90 percent or more of borers was killed.

Test Example 14

On rice plants grown in a pot, which had elapsed 40 days after sowing, each dust obtained in Example 23 was spread in a proportion of 3 kg/10a. by means of a bell jar duster, and 30 adults of green rice leafhoppers were liberated therein.

The whole was covered with a glass tube, and the leafhoppers knocked down was counted, whereby 90 percent of the leafhoppers was knocked down within 60 minutes.

Test Example 15

On Chinese cabbage plants grown in a pot which had elapsed one month after sowing, many green peach aphids (*Myzue persicae*) were made parasitic. Each granule obtained in Examples 22 and 30 was spread at the foot of the Chinese cabbage in a proportion of 6 kg/10a. After 3 days, the dead and alive were observed to find that 90 percent or more of the aphids was killed by each dust.

Test Example 16

Rice plants were grown up to branching in a 1/100,000 Wagner pot, and eggs of rice stem borers just before the hatch were inoculated in a proportion of about 100 eggs per pot. After the borers hatched, bore into the plants, each dust obtained in Example 29 was spread thereto in a proportion of 4 kg/10a. by means of a bell jar duster. On a week thereafter the plants were destroyed in order to observe the dead and alive, and it was found that 90 percent or more of the boreres was killed.

Test Example 17

About 20 carmine mites (*Tetranychus telarius*) were inoculated to 2 kidney beans per pot which had elapsed 10 days after sowing. Each emulsifiable concentrates containing the present compounds (1), (2) and (12) which were obtained in Example 12 was diluted to 200 times with water, and 50 percent emulsifiable concentrates of PPPS {2-[2-(p-ter.-butylphenoxy)-1-methylethoxy]-1-methyl-2-chloroethylsulfite} to 500 times.

On a week after the inoculation, the resulting emulsion was sprayed to the pot on a turn table.

After a week, there were observed degrees of harm in the plants and of the propagation of the mites, and the results are as shown in Table 6.

The degree of harm of kidney beans is shown in terms of (−) (almost no harm) and (+++) (completely death), two stages being between (−) and (+++).

The degree of the propagation of the mites is shown in terms of (−) no mite being alive
(+) 0 to 30 percent of the mites being alive
(++) 30 to 70 percent of the mites being alive, and
(+++) 70 percent or more of the mites being alive.

Table 6

| Compound | | Concentration of the active ingredient (times) | Degree of the harm of kidney bean | Degree of the Propagation of mites | Relative evaluation |
| --- | --- | --- | --- | --- | --- |
| Present compound | (1) | × 1000 | − | − | higher effect than PPPS |
| do. | (2) | × 1000 | − | − | do. |
| do. | (12) | × 1000 | − | + | effect similar to that of PPPS |
| PPPS | | × 1000 | − | + | effective |
| no treatment | | − | +++ | +++ | − |

What is claimed is:

1. An α-cyanobenzyl cyclopropanecarboxylate of the formula

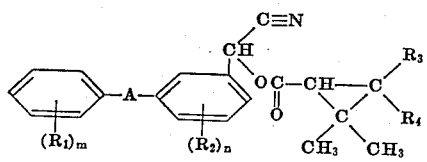

wherein A is oxygen or methylene, $R_1$ and $R_2$ are respectively hydrogen, halogen or methyl, $R_3$ is hydrogen or methyl, $R_4$ is hydrogen, methyl, or

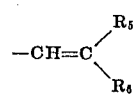

in which $R_5$ is hydrogen or methyl, and $R_6$ is hydrogen, methyl, methoxycarbonyl or methoxymethyl, or $R_5$ and $R_6$ are combined with each other at the ends to form tetramethylene, provided that $R_4$ is methyl when $R_3$ is methyl, and m is an integer of 1 to 3 and n is 1.

2. The α-cyanobenzyl cyclopropanecarboxylate according to claim 1, wherein $R_3$ is hydrogen and $R_4$ is

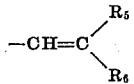

in which $R_5$ and $R_6$ are as defined in claim 1.

3. The α-cyanobenzyl cyclopropanecarboxylate according to claim 2, wherein each $R_5$ and $R_6$ is methyl.

4. The α-cyanobenzyl cyclopropanecarboxylate according to claim 2, wherein $R_5$ is methyl $R_6$ is methoxycarbonyl.

5. The α-cyanobenzyl cyclopropanecarboxylate according to claim 1, wherein each $R_3$ and $R_4$ is methyl.

6. A compound of the formula,

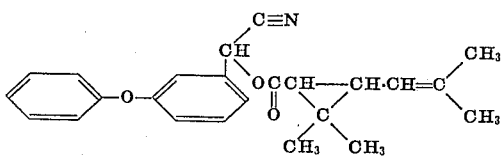

7. A compound of the formula,

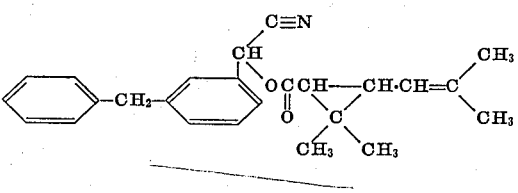

* * * * *